United States Patent
Chen et al.

(10) Patent No.: US 9,556,335 B2
(45) Date of Patent: Jan. 31, 2017

(54) SHELF LIFE OF POLYOL BLENDS CONTAINING HALOGENATED OLEFINS BY ENCAPSULATION OF ACTIVE COMPONENTS

(71) Applicant: Arkema Inc., King of Prussia, PA (US)

(72) Inventors: Benjamin Bin Chen, Wayne, PA (US); Joseph S. Costa, Gilbertsville, PA (US); Laurent Abbas, Narberth, PA (US); Sri R. Seshadri, Holland, PA (US)

(73) Assignee: Arkema Inc., King of Prussia, PA (US)

( * ) Notice: Subject to any disclaimer, the term of this patent is extended or adjusted under 35 U.S.C. 154(b) by 71 days.

(21) Appl. No.: 14/374,616

(22) PCT Filed: Jan. 31, 2013

(86) PCT No.: PCT/US2013/023974
§ 371 (c)(1),
(2) Date: Jul. 25, 2014

(87) PCT Pub. No.: WO2013/116416
PCT Pub. Date: Aug. 8, 2013

(65) Prior Publication Data
US 2014/0371338 A1    Dec. 18, 2014

Related U.S. Application Data

(60) Provisional application No. 61/593,983, filed on Feb. 2, 2012.

(51) Int. Cl.
*C08L 75/04* (2006.01)
*C08G 18/40* (2006.01)
*C08J 9/14* (2006.01)
*C08G 101/00* (2006.01)

(52) U.S. Cl.
CPC .......... *C08L 75/04* (2013.01); *C08G 18/4018* (2013.01); *C08J 9/14* (2013.01); *C08J 9/144* (2013.01); *C08J 9/149* (2013.01); *C08G 2101/005* (2013.01); *C08G 2101/0025* (2013.01); *C08J 2203/06* (2013.01); *C08J 2203/12* (2013.01); *C08J 2203/142* (2013.01); *C08J 2203/146* (2013.01); *C08J 2203/162* (2013.01); *C08J 2203/182* (2013.01); *C08J 2375/04* (2013.01); *C08L 2203/14* (2013.01)

(58) Field of Classification Search
CPC ................... C08G 18/4018; C08G 2101/0025; C08G 2101/005; C08J 9/14; C08J 9/144; C08J 9/149; C08J 2203/06; C08J 2203/12; C08J 2203/142; C08J 2203/146; C08J 2203/162; C08J 2203/182; C08J 2375/04; C08L 75/04; C08L 2203/14
See application file for complete search history.

(56) References Cited

U.S. PATENT DOCUMENTS

| | | | |
|---|---|---|---|
| 5,177,117 A | 1/1993 | Coe et al. | |
| 5,856,679 A * | 1/1999 | Barthelemy | C08G 18/16 252/182.24 |
| 6,100,230 A * | 8/2000 | Bement | C09K 3/30 252/364 |
| 6,224,793 B1 | 5/2001 | Hoffman et al. | |
| 6,365,566 B1 * | 4/2002 | Bogdan | C08J 9/146 510/408 |
| 2003/0004077 A1 * | 1/2003 | Bogdan | C08G 18/4883 510/177 |
| 2005/0208144 A1 | 9/2005 | Igari et al. | |
| 2007/0249743 A1 | 10/2007 | Sehanobish et al. | |
| 2009/0099273 A1 | 4/2009 | Williams et al. | |
| 2009/0099274 A1 | 4/2009 | Van Der Puy et al. | |
| 2011/0152392 A1 | 6/2011 | Van Der Puy et al. | |
| 2013/0041048 A1 | 2/2013 | Chen et al. | |

FOREIGN PATENT DOCUMENTS

| | | |
|---|---|---|
| GB | 1035903 | 7/1966 |
| JP | 8337757 A2 | 12/1996 |
| WO | WO 0231013 A1 | 4/2002 |
| WO | WO 03085021 A1 | 10/2003 |
| WO | WO2011137033 | * 11/2011 |

* cited by examiner

*Primary Examiner* — Irina S Zemel
(74) *Attorney, Agent, or Firm* — Steven D. Boyd

(57) ABSTRACT

The shelf life of polyurethane polyol pre-blends containing halogenated olefins is extended by encapsulation of active components such as catalysts and/or surfactants. The active component is encapsulated in a crystallizable or thermoplastic polymer. The encapsulated particles have a size of 2,800 microns or less and the active components are not significantly leaked out, particularly in the presence of halogenated olefins.

12 Claims, No Drawings

SHELF LIFE OF POLYOL BLENDS CONTAINING HALOGENATED OLEFINS BY ENCAPSULATION OF ACTIVE COMPONENTS

This present application is the national phase under 35 USC §371 of prior PCT International Application Number PCT/US2013/023974 tiled Jan. 31, 2013 which designated the United States of America and claimed priority to U.S. Provisional Patent Application Ser. No. 61/593,983 filed Feb. 2, 2012.

FIELD OF THE INVENTION

The present invention relates to a method for stabilizing thermosetting foam blends that include halogenated olefinic blowing agent, such as hydrochlorofluoroolefin (HCFO) HCFO-1233zd. More particularly, the present invention relates to a method for stabilizing thermosetting foam blends using encapsulated active components such as catalysts, and surfactants. The present invention further relates to the stable pre-blend formulations and resulting polyurethane or polyisocyanurate foams.

BACKGROUND OF THE INVENTION

The Montreal Protocol for the protection of the ozone layer, signed in October 1987, mandated the phase out of the use of chlorofluorocarbons (CFCs). Materials more "friendly" to the ozone layer, such as hydrofluorocarbons (HFCs) eg HFC-134a replaced chlorofluorocarbons. The latter compounds have proven to be green house gases, causing global warming and were regulated by the Kyoto Protocol on Climate Change, signed in 1998. The emerging replacement materials, hydrofluoropropenes, were shown to be environmentally acceptable i.e. has zero ozone depletion potential (ODP) and acceptable low global warming potential (GWP).

Currently used blowing agents for thermoset forms include HFC-134a, HFC-245fa, HFC-365mfc that have relatively high global warming potential, and hydrocarbons such as pentane isomers which are flammable and have low energy efficiency. Therefore, new alternative blowing agents are being sought. Halogenated hydroolefinic materials such as hydrofluoropropenes and/or hydrochlorofluoropropenes have generated interest as replacements for HFCs. The inherent chemical instability of these materials in the lower atmosphere provides the low global warming potential and zero or near zero ozone depletion properties desired.

It is convenient in many applications to provide the components for polyurethane or polyisocyanurate foams in pre-blended formulations. Most typically, the foam formulation is pre-blended into two components. The polyisocyanate and optional isocyanate compatible raw materials comprise the first component, commonly referred to as the "A-" side component. A polyol or mixture of polyols, surfactant, catalyst, blowing agent, and other isocyanate reactive and non-reactive components comprise the second component, commonly referred to as the "B-" side component. Accordingly, polyurethane or polyisocyanurate foams are readily prepared by bringing together the A- and B-side components either by hand mix for small preparations and, preferably, machine mix techniques to form blocks, slabs, laminates, pour-in-place panels and other items, spray applied foams, froths, and the like.

It has been found that the B-side composition of two-component systems have reduced shelf-life, especially those systems which use certain hydrohaloolefins such as HFO-1234ze and HCFO-1233zd. Normally when foam is produced by bringing together the A and B side components, good foam is obtained. However, if the polyol pre-mix composition (B-side) containing hydrohaloolefins is aged prior to treatment with the polyisocyanate (A-side), the foams are of lower quality and may even collapse during the formation of the foam. The poor foam structure is believed to be attributed to the reaction of certain catalysts with certain hydrohaloolefins, including HFO-1234ze and HCFO-1233zd, which results in the partial decomposition of the blowing agent and, subsequently, the undesirable modification of the polymeric silicone surfactants.

One way to overcome this problem, is by separating the blowing agent, surfactant, and catalyst, and introducing them using as separate streams from the "A-" or "B-" side components, a three stream/component methodology. However, a solution that would not require such reformulation or process change would be preferred. A more favorable method may be to utilize a technology to protect active components such as catalysts and surfactants from their reaction with the blowing agent in the B-side during storage, such as encapsulation using a polymer that its crystallization properties can be thermally tailored to the system.

The commonly used catalysts for polyurethane chemistry can be classified into two broad categories: amine and metallic compounds Amine catalysts are generally selected based on whether they drive the gel catalysis (or polymerization) reaction, in which polyfunctional isocyanates react with polyols to form polyurethane, or the blow catalysis (or gas-producing) reaction in which the isocyanate reacts with water to form polyurea and carbon dioxide Amine catalysts can also drive the isocyanate trimerization reaction. Since some amine catalysts will drive all three reactions to some extent, they are often selected based on how much they favor one reaction over another.

U.S. Patent Application Publication No. 2009/0099274 discloses the use of sterically hindered amines that have low reactivity with hydrohaloolefins in foaming systems. Sterically hindered amines are known to be gelling catalysts. Gelling catalysts are typically tertiary amines characterized in that they have higher selectivity for catalyzing the gelling or urethane reaction over the blowing or urea reaction. These catalysts are expected to perform poorly in systems containing high concentrations of water because of their inability to activate water towards isocyanate.

US Patent Application Publication No. 2009/0099273 discloses that . . . "A shortcoming of two-component systems, especially those using certain hydrohaloolefins, including, HFO-1234ze and HFCO-1233zd is the shelf-life of the B-side composition. Normally when foam is produced by bringing together the A and B component, good foam is obtained. However, if the polyol premix composition is aged, prior to treatment with the polyisocyanate, the foam are of lower quality and may even collapse during the formation of foam", and discloses the use of non-silicone surfactants to stabilize the B-side.

U.S. Pat. No. 6,224,793 discloses the encapsulation of active agents such as catalysts curing agents or accelerators useful in preparing polyurethane to provide for one-part curable compositions which do not require shipment in two parts, an A-side and a B-side. The encapsulated active agents can be designed to release the active agent at a desired temperature. The encapsulated active agents disclosed demonstrate stability for greater than 3 days when exposed to ambient conditions (about 23° C. and about 50 percent relative humidity) and even more preferably for 5 days or greater.

The object of the present invention is to provide novel method of stabilizing polyol blends in presence of low GWP blowing agents by encapsulating of active components such as catalysts and surfactants.

BRIEF SUMMARY OF THE INVENTION

It has now been discovered that encapsulated active components such as catalysts and surfactants have less reactivity with hydrohaloolefins than traditional catalysts and surfactants. Specifically, it has now been discovered that catalysts encapsulated using a crystallizable or thermoplastic polymer may be used to stabilize thermosetting foam blends having halogenated olefinic blowing agents in a polyol pre-mix B-side. The stabilization method was found to prolong the shelf life of the pre-mix and enhance the foam characteristics of the resultant foam.

The present invention is directed towards polyol pre-blends comprising hydrohaloolefins blowing agents and active components encapsulated in a crystallizable or thermoplastic polymer. The particle size of encapsulated active components is 2,800 microns or less, where the active components are not significantly extractable from the particle under ambient conditions. It is preferable that the amount of active component extracted from the particle when a hydrohaloolefin is present in a polyol pre-blend, is 50% or less.

In a preferred embodiment the encapsulating agent is a crystallizable polymer, and is more preferably a side chain crystallizable polymer comprising a polymer or copolymer of an alkyl acrylate or alkyl methacrylate in which the polymer has substituted or unsubstituted side chains of about 6 to 50 carbons. In another embodiment the thermoplastic or crystallizable polymer has a transition point or melting point of 30 to 250° C. In yet another embodiment, the process of preparing an encapsulated agent comprises 1) contacting an active component with a crystallizable or thermoplastic polymer wherein the polymer is molten and the active component is not volatile or having low volatility under contacting conditions; 2) forming particles of about 2800 microns or less; and 3) exposing the coated particles to the conditions so that the portion at and near the surface can solidify rapidly.

In a preferred embodiment the active components are an amine, or an organic metal salt, or silicone surfactant and or mixtures thereafter. The encapsulated active components demonstrate excellent stability under ambient temperature and exhibit relatively fast reactivity at a desired temperature.

Accordingly, encapsulated amine catalysts are a favorable replacement for traditional catalysts, such as dimethylcyclohexylamine (DMCHA) and pentamethyldiethyltriamine (PMDETA), as a component of a polyol pre-mix blend, in the process for stabilizing thermosetting foam blends, and in the resultant polyurethane or polyisocyanurate foams. The method of the present invention was found to surprisingly stabilize the pre-mix blends, while the blend compositions of the present invention were surprisingly found to possess long shelf life. The resultant foams of the present invention were found to have enhanced foam characteristics and may be employed to meet the demands of low or zero ozone depletion potential, lower global warming potential, low VOC content, and low toxicity, thereby making them environmentally-friendly.

In one embodiment, the present invention provides a polyol pre-mix composition which comprises a halogenated hydroolefin blowing agent, a polyol, a surfactant, and an encapsulated catalyst composition. In another embodiment, the present invention provides a polyol pre-mix composition which comprises a halogenated hydroolefin blowing agent, a polyol, a surfactant, and an encapsulated catalyst composition comprising more than one amine catalyst.

The blowing agent may comprise a halogenated hydroolefin blowing agent and, optionally a co-blowing agent such as hydrocarbons, alcohols, aldehydes, ketones, ethers/diethers, or $CO_2$ generating materials, or combinations thereof. The surfactant may be a silicone or non-silicone surfactant. In some embodiments, the present invention may further include metallic salts, such as, for example, alkali earth carboxylates, alkali carboxylates, and carboxylates of zinc (Zn), cobalt (Co), tin (Sn), cerium (Ce), lanthanum (La), aluminum (Al), vanadium (V), manganese (Mn), copper (Cu), nickel (Ni), iron (Fe), titanium (Ti), zirconium (Zr), chromium (Cr), scandium (Sc), calcium (Ca), magnesium (Mg), strontium (Sr), and barium (Ba). These carboxylates can be readily formulated into a typical polyol pre-mix.

In another embodiment the present invention provides a stabilized thermosetting foam blend which comprises: (a) a polyisocyanate and, optionally, isocyanate compatible raw materials; and (b) a polyol pre-mix composition which comprises a hydrohaloolefin blowing agent, a polyol, a surfactant, and an encapsulated catalyst composition. In another embodiment the catalyst composition of the stabilized thermosetting foam blend comprises more than one amine catalyst.

In a further embodiment, the present invention is a method for stabilizing thermosetting foam blends which comprises combining: (a) a polyisocyanate and, optionally, isocyanate compatible raw materials; and (b) a polyol pre-mix composition which comprises a hydrohaloolefin blowing agent, a polyol, a surfactant, and an encapsulated catalyst composition. Accordingly, polyurethane or polyisocyanurate foams are readily prepared by bringing together the A- and B-side components either by hand mix for small preparations and, preferably, machine mix techniques to form blocks, slabs, laminates, pour-in-place panels and other items, spray applied foams, froths, and the like.

It has unexpectedly been discovered that encapsulated amine catalysts have less reactivity with hydrohaloolefins than traditional catalysts. The encapsulated amine catalysts were also surprisingly found to have better catalytic performance than other catalysts. The use of encapsulated amine catalysts in a polyol pre-mix blend composition surprisingly produced a thermoset blend composition that has prolonged shelf-life stability. The inventors of the present invention have further found that metallic salts, such as, for example, alkali earth carboxylates, alkali carboxylates, and carboxylates of zinc (Zn), cobalt (Co), tin (Sn), cerium (Ce), lanthanum (La), aluminum (Al), vanadium (V), manganese (Mn), copper (Cu), nickel (Ni), iron (Fe), titanium (Ti), zirconium (Zr), chromium (Cr), scandium (Sc), calcium (Ca), magnesium (Mg), strontium (Sr), and barium (Ba) have good hydrofluoric acid (HF) scavenger activity and add to the stabilization effect of the oxygen-containing amine catalysts. For example, metallic salts having one or more functional carboxyl groups may be employed as a HF scavenger. Such metallic salts may include, for example, magnesium formate, magnesium benzoate, magnesium octoate, calcium formate, calcium octoate, zinc octoate, cobalt octoate, stannous octoate, and dibutyltindilaurate (DBTDL). Optionally, a solvent may be utilized to dissolve the metallic salts for mixing with the polyol blend composition. Additionally, it is surprising and unexpected that the foams produced by mixing a polyol pre-mix blend composition with a polyisocyanate have a uniform cell structure with little or no foam collapse.

DETAILED DESCRIPTION OF THE INVENTION

Polyurethane foaming was studied by using halogenated olefins such as the hydrochlorofluoroolefin, 1-chloro-3,3,3-trifluoropropene, commonly referred to as HCFO-1233zd. The blends for polyurethane foam include a polyol, a surfactant, an amine catalyst, a halogenated olefin, and a carbon dioxide ($CO_2$) generating material. It is now surprisingly found that encapsulated amine catalysts in accordance with the present invention result in improved stability of the foam blends over time. Additionally, the resultant foams were surprisingly found to have a uniform cell structure with little or no foam collapse. Furthermore, the foam blends showed unexpected stability when a metallic salt, such as an alkali earth salt, was used.

Without being held to the theory, it is believed that the problem of the diminished shelf-life stability of the two-component systems, especially those using HCFO-1233zd, is related to the reaction of the halogenated olefins with the amine catalyst. The reaction produces hydrofluoric acid (HF) which attacks the silicone surfactant in situ. This side reaction was confirmed by hydrogen, fluorine, and silicon nuclear magnetic resonance (NMR) spectra and gas chromatography-mass spectrometry (GC-MS). This effect can be summarized as the nucleophilic attack of the amine catalyst on the $C_1$ of the HCFO-1233zd halogenated olefin. Accordingly, the embodiments of the present invention reduce such detrimental interaction by decreasing the reactivity of the HCFO-1233zd halogenated olefin with an encapsulated amine catalyst.

Polyol pre-blends of the present invention comprise encapsulated active components comprising active components encapsulated in a crystallizable or thermoplastic polymer and hydrohaloolefins. The particle size of encapsulated active component is 2,800 microns or less, in which the active components are not significantly extractable from the particle under ambient conditions. Because of unexpectedly strong interaction between HCFO-1233zd and an amine, it is preferable that the amount of active component extracted from the particle when a hydrohaloolefin is present in a polyol pre-blend, is 50% or less.

In a preferred embodiment, the encapsulating agent is a crystallizable polymer, and is more preferably a side chain crystallizable polymer comprising a polymer or copolymer of an alkyl acrylate or alkyl methacrylate in which the polymer has substituted or unsubstituted side chain of about 6 to 50 carbons. In another embodiment the thermoplastic or crystallizable polymer has a transition point of 30 to 250° C. Transition temperature/point as used herein refers to the temperature at which the thermoplastic or crystallizable polymer changes resulting in the release of the active component. The active components can either be released or permeate out of the particles. It is preferred that crystallizable or thermoplastic polymer should cross over the transition temperature for rapid melt over a small temperature window so that release of the active components can occur rapidly. The preferred temperature window is between 30 to 110° C.

In yet another embodiment, the process of preparing an encapsulated agent comprises, 1) contacting an active component with a crystallizable or thermoplastic polymer wherein the polymer is molten and the active component is not volatile or has a low volatility under contacting conditions; 2) forming particles of about 2800 microns or less; and 3) exposing particles to the conditions so that the portion at and near the surface can solidify rapidly.

Preferable thermoplastic polymers include styrenics, styrene acrylonitriles, low molecular weight chlorinated polyethylenes, soluble cellulosics, acrylics, such as methyl methacrylate or cycloaliphatic acrylates based.

Preferable crystalline polymers include polyolefin, polyester, polyamide, phenoxy thermoplastic, polylactic acid, polyether, polyalkylene glycol or a side chain crystallizable polymer. More preferable polymers include polyethylene, polypropylene, polyether, polyethylene glycol, phenoxy thermoplastic, and polylactic acid or side chain crystallizable polymer. Even more preferable thermoplastic polymers include polyethylene, polyethylene glycol, or a side crystallizable polymer, and chain acrylate polymer is the most preferred. The crystallizable polymer can be homopolymer or copolymer of two or more comonomers, including random copolymers, graft copolymers, block copolymers and thermoplastic elastomer. It is preferred that at least part of the crystallizable polymer is from a side chain crystallizable (SCC) polymer. The SCC polymer may be from one or more acrylate, methacrylate, olefinic, epoxy, vinyl, ester-containing, amide containing or ether containing monomers. Such preferred polymeric moieties include but are not limited to those where the crystallinity of polymers is mainly from the polymer backbone that contains 2 to 12, preferably 2 to 8 carbon atoms. The monomer formula can be $CH_2=CHR$ where R is hydrogen, methyl, propyl, butyl, pentyl, 4-methylpentyl, hexyl, or heptyl, and other polymers such as polyesters, polyamides, and polyalkylene oxides, i.e. polytetrahydrofuran. Crystallinity described as DSC heat of fusion is at least 10 J/g with 20 J/g preferred.

SCC polymer moieties which can be used include moieties derived from known SCC polymers, e.g. polymers derived from one or more monomers such as substituted and unsubstituted acrylates, methacrylate, fluoroacrylates, vinyl esters, acrylamides, methacrylamides, maleimides, α-olefins, ρ-alkyl styrenes, alkylvinyl ethers, alkylethylene oxides, alkyl phosphazenes and amino acids; polyisocyanates; polyurethanes; polysilanes; polysiloxanes; and polyethers; all of such polymers contain long chain crystallizable groups. Suitable SCC polymers are described e.g. in J. Poly. Sci. 60, 19 (1962), J. Poly. Sci. (Polymer Chemistry) 7, 3053 (1969), 9, 1835, 3349, 3351, 3367, 10, 1657, 3347, 18, 2197, 19, 1871, J. Poly. Sci. Polymer Physics Ed. 18, 2197 (1980), J. Poly. Sci. Macromol. Rev. 8, 117 (1974), Macromolecules 12, 94 (1979), 13, 12, 15, 18, 2141, 19, 611, JACS 75, 3326 (1953), 76; 6280, Polymer J. 17, 991 (1985); and Poly. Sci. USSR 21, 241 (1979). The SCC polymer comprises an organic radical forming part of the polymer backbone and side chains comprising a crystallizable moiety that may be connected to the polymer backbone directly or through a divalent organic or inorganic radical, e.g. an ester, carbonyl, amide, hydrocarbon (e.g. phenylene), amino, or ether link, or through an ionic salt linkage (e.g. a carboxyalkyl ammonium, sulfonium or phosphonium ion pair). The radical Cy may be aliphatic or aromatic, e.g. alkyl of at least 10 carbons, fluoralkyl of at least about 6 carbons or p-alkyl styrene wherein the alkyl contains about 6 to about 24 carbons. The SCC moiety may contain two or more different repeating units of this general formula. The SCC may also contain other repeating units, but the amount of such other units is preferably such that the total weight of the crystallizable groups is at least equal to, and preferably twice the weight of the remainder of the block. Preferred SCC moieties comprise side chains containing in total at least about 5 times as many carbon atoms as the backbone of the moiety, particularly side chains comprising linear polymethylene moieties containing about 12 to about 50, especially about 14 to about 22 carbon atoms, or linear perfluorinated or substantially perfluorinated polymethylene moieties containing 6 to 50 carbon atoms. Other polymers which can provide SCC moieties for use include atactic and isotactic polymers of n-alkyl α-olefins; polymers of n-alkylglycidyl ethers; polymers of n-alkyl vinyl ethers; polymers of n-alkyl oxycarbonylamido-ethylmethacrylates; polymers of n-fluoroalkyl acrylates; polymers of n-alkyloxazolines; polymers obtained by reacting an hydroxyalkyl acrylate or methacrylate with an alkyl isocyanate; and polymers obtained by reacting a difunctional isocyanate, a hydroxyalkyl acrylate or methacrylate, and a primary fatty alcohol.

Preferred SCC polymer moieties comprise about 30 to about 100 percent preferably about 40 to about 100 percent, of units derived from at least one monomer selected from the group consisting of alkyl acrylates, alkyl methacrylates, N-alkyl acrylamides, N-alkyl methacrylamides, alkyl oxazolines, alkyl vinyl ethers, alkyl vinyl esters, alpha-olefins, alkyl 1,2-epoxides and alkyl glycidyl ethers in which the alkyl groups are n-alkyl groups containing 12 to 50 carbon atoms, and the corresponding fluoroalkyl monomers in which the thermoalkyl groups are n-fluoroalkyl groups containing about 6 to about 50 carbon atoms; about 0 to about 20 percent of units derived from at least one monomer selected from the group consisting of alkyl acrylates, alkyl methacrylates, N-alkyl acrylamides, alkyl vinyl ethers, and alkyl vinyl esters in which the alkyl groups are n-alkyl groups containing about 4 to about 12 carbon atoms; and about 0 to about 15 percent of units derived from at least one polar monomer selected from the group consisting of acrylic acid, methacrylic acid, itaconic acid, acrylamide, methacrylamide, acrylonitrile, methacrylonitrile, vinyl acetate and N-vinyl pyrrolidone. Such SCC moieties may also contain units derived from other monomers to change compatibility with the matrix, or to raise the modulus of a reaction product containing the modifying agent; such monomers include styrene, vinyl acetate, mono acrylic functional polystyrene and the like. Preferably, the side chain crystalline polymers used do not contain a significant amount of functional groups, such as those having active hydrogen atoms, as the presence of a significant amount of active hydrogen atoms increases the viscosity of the polymers and this can negatively impact the process used to prepare the encapsulated active agent particles. The number average molecular weight of the SCC polymer moiety is preferably less than about 200,000, more preferably less than about 100,000, particularly less than about 50,000, more particularly about 1,000 to about 20,000. The molecular weight of the SCC polymer moiety can be adjusted (e.g. through choice of the reaction conditions and addition of chain transfer agents) so as to optimize the reactivity of attached moieties without substantial change in $T_m$.

The encapsulated active agent may be prepared by the following procedures: 1) dispersing or dissolving the active agent in the encapsulating material at a temperature sufficient to melt the encapsulating material and not so high that the active agent volatilizes; 2) forming droplets of active agent interspersed with the encapsulating material; and 3) cooling the droplets to solidify the encapsulated material. Optionally, the process may further comprise 4) contacting the droplets with a solvent that dissolves the active agent but does not dissolve the encapsulating material, so as to remove active agent from the surface of the encapsulating material. It is preferable to avoid this last step. This process is described in U.S. Pat. No. 5,601,761 incorporated herein by reference. More particularly the encapsulating agent is heated until it is in the liquid state, i.e. molten. Thereafter, the active agent is dispersed in the encapsulating agent. Preferably, the active agent is not volatile under the conditions at which the encapsulating agent is molten. The mixture is formed into particles, preferably of about 2800 microns or less.

Commonly used catalysts for polyurethane chemistry can generally be classified into two broad categories: amine and metallic compounds. Traditional amine catalysts include tertiary amines, such as pentamethyldiethylenetriamine (PMDETA), triethylenediamine (TEDA), dimethylcyclohexylamine (DMCHA), and dimethylethanolamine (DMEA). Amine catalysts are generally selected based on whether they drive the gelling reaction or the blowing reaction. In the gelling reaction, polyfunctional isocyanates react with polyols to form polyurethane. In the blowing reaction, the isocyanate reacts with water to form polyurea and carbon dioxide. Amine catalysts can also drive the isocyanate trimerization reaction. These reactions take place at different rates; the reaction rates are dependent on temperature, catalyst level, catalyst type and a variety of other factors. However, to produce high-quality foam, the rates of the competing gelling and blowing reactions must be properly balanced.

Some known amine catalysts, such as sterically hindered amine catalysts, have been found to have good gelling reaction functionality, but perform poorly as blow reaction catalysts. For example, tetramethylbutanediamine (TMBDA) preferentially drives the gel reaction over the blow reaction. On the other hand, both pentamethyldipropylenetriamine and N-(3-dimethylaminopropyl)-N,N-diisopropanolamine balance the blow and gel reactions, although the former is more potent than the later on a weight basis. Molecular structure gives some clue to the strength and selectivity of the catalyst. Blow catalysts generally have an ether linkage two carbons away from a tertiary nitrogen. Examples include bis-(2-dimethylaminoethyl)ether and N-ethylmorpholine. Strong gel catalysts may contain alkyl-substituted nitrogens, such as triethylamine (TEA), 1,8-diazabicyclo[5.4.0]undecene-7 (DBU). Weaker gel catalysts may contain ring-substituted nitrogens, such as benzyldimethylamine (BDMA). Trimerization catalysts may contain the triazine structure, or are quaternary ammonium salts. Catalysts that contain a hydroxyl group or an active amino hydrogen, such as N,N,N'-trimethyl-N'-hydroxyethyl-bis(aminoethyl)ether and N'-(3-(dimethylamino)propyl)-N,N-dimethyl-1,3-propanediamine that react into the polymer matrix can replace traditional catalysts in some applications for aesthetic or environmental purposes.

The oxygen-containing amine catalysts of the present invention include those amines containing ether and/or a hydroxyl group. For example, the oxygen-containing amine catalyst may be an alkanolamine, ether amine or a morpholine group-containing catalyst such as an N-alkyl substituted morpholine. The catalyst may contain one, two, three or more nitrogen atoms in the form of amine functional groups. In one embodiment, all of the amine groups present in the catalyst molecule are tertiary amine groups. The catalyst, in one embodiment, may contain two, three or more oxygen atoms; these oxygen atoms may be present in the form of ether groups, hydroxyl groups or both ether and hydroxyl groups. Suitable oxygen-containing amine catalysts include compounds corresponding to the following chemical structure:

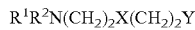

wherein $R^1$ and $R^2$ are the same or different and are each a $C_1$-$C_6$ alkyl group, such as methyl, and/or an alkanol group, such as —$CH_2CH_2OH$ or $CH_2CH(CH_3)OH$; X is O or $NR^3$ and/or it can be terminated by OH, where $R^3$ is a $C_1$-$C_6$ alkyl group, such as methyl, or an alkanol group, such as —$CH_2CH_2OH$ or $CH_2CH(CH_3)OH$; and Y is OH or $NR^4R^5$, where $R^4$ and $R^5$ are the same or different and are each a $C_1$-$C_6$ alkyl group, such as methyl, and/or an alkanol group such as —$CH_2CH_2OH$ or —$CH_2CH(CH_3)OH$; subject to the proviso that the compound contains at least one ether and/or hydroxyl group.

Exemplary oxygen-containing amine catalysts include:
bis-(2-dimethylaminoethyl)ether;
N,N-dimethylethanolamine;
N-ethylmorpholine;
N-methylmorpholine;
N,N,N'-trimethyl-N'-hydroxyethyl-bisaminoethylether;
N-(3-dimethylaminopropyl)-N,N-diisopropanolamine;
N,N-bis(3-dimethylaminopropyl)-N-isopropanolamine;
2-(2-dimethylaminoethoxy)ethanol;
N,N,N'-trimethylaminoethyl-ethanolamine; and
2,2'-dimorpholinodiethylether, and mixtures thereof.

As described above, catalysts function to control and balance the gelling and blowing reactions. Tertiary amine catalysts have their own specific catalytic characteristics such as gelling, blowing, and crosslinking activity. As would be appreciated by one having ordinary skill in the art, these catalytic activities have a strong relationship with rise profile, blowing efficiency, moldability, productivity, and other properties of the resulting foam.

Exemplary amine catalysts include: N-(3-dimethylaminopropyl)-N,N-diisopropanolamine, N,N-bis(3-dimethylaminopropyl)-N-isopropanolamine, 1,3-propanediamine, N'-(3-dimethylamino)propyl-N,N-dimethyl-, triethylenediamine, 1,2-dimethylimidazole, 1,3-propanediamine, N'-(3-(dimethylamino)propyl)-N,N-dimethyl-, N,N,N'N'-tetramethylhexanediamine, N,N''',N''-trimethylaminoethylpiperazine, N,N,N',N' tetramethylethylenediamine, N,N-dimethylcyclohexylamine (DMCHA), Bis(N,N-dimethylaminoethyl)ether (BDMAFE), 1,4-diazadicyclo[2,2,2] octane (DABCO), 2-((2-dimethylaminoethoxy)-ethyl methyl-amino)ethanol, 1-(bis(3-dimethylamino)-propyl) amino-2-propanol, N,N',N''-tris(3-dimethylamino-propyl) hexahydrotriazine, dimorpholinodiethylether (DMDEE), N,N-dimethylbenzylamine, N,N,N',N'',N''-pentaamethyldipropylenetriamine, N,N'-diethylpiperazine, dicyclohexylmethylamine, ethyldiisopropylamine, dimethylcyclohexylamine, dimethylisopropylamine, methylisopropylbenzylamine, methylcyclopentylbenzylamine, isopropyl-sec-butyl-trifluoroethylamine, diethyl-(α-phenyethyl)amine, tri-n-propylamine, dicyclohexylamine, t-butylisopropylamine, di-t-butylamine, cyclohexyl-t-butylamine, de-sec-butylamine, dicyclopentylamine, di-(α-trifluoromethylethyl)amine, di-α-phenylethyl)amine, triphenylmethylamine, and 1,1-diethyl-n-propylamine. Other amines include morpholines, imidazoles, ether containing compounds such as dimorpholinodiethylether, N-ethylmorpholine, N-methylmorpholine, bis(dimethylaminoethyl) ether, imidizole, n-methylimidazole or 1-methylimidazole, 1,2-dimethylimidazole, dimorpholinodimethylether, N,N, N',N',N'',N''-pentamethyldipropylenetriamine, and bis(diethylaminoethyl)ether, bis(dimethylaminopropyl)ether, and combinations thereof.

Known stabilization methods have focused on the use of various stabilizers to serve as scavengers for hydrofluoric acid. These stabilizers include alkenes, nitroalkanes, phenols, organic epoxides, amines, bromoalkanes, bromoalcohols, and alpha-methylstyrene, among others. More recently, methods have focused on the use of sterically hindered amines and organic acids, but these sacrifice catalytic activity.

The inventors of the present invention have now discovered the favorable use of encapsulated amine catalysts, which were found to have much less reactivity with the halogenated olefins, such as HCFO-1233zd (E and/or Z) and HFO1234ze (E and/or Z), than traditional catalysts and better catalytic activity than sterically hindered amine catalysts. The inventors of the present invention have further found that metallic salts, such as, for example, alkali earth carboxylates, alkali carboxylates, and carboxylates of zinc (Zn), cobalt (Co), tin (Sn), cerium (Ce), lanthanum (La), aluminum (Al), vanadium (V), manganese (Mn), copper (Cu), nickel (Ni), iron (Fe), titanium (Ti), zirconium (Zr), chromium (Cr), scandium (Sc), calcium (Ca), magnesium (Mg), strontium (Sr), and barium (Ba) have good hydrofluoric acid (HF) scavenger activity and add to the stabilization effect of the oxygen-containing amine catalysts. For example, metallic salts having one or more functional carboxyl groups may be employed as HF scavengers. Such metallic salts may include, for example, magnesium formate, magnesium benzoate, magnesium octoate, calcium formate, calcium octoate, zinc octoate, cobalt octoate, stannous octoate, and dibutyltindilaurate (DBTDL).

The blowing agents of the present invention comprise an unsaturated halogenated hydroolefin such as hydrofluoroolefin, hydrochlorofluoroolefin, and the like, in particular, 1-chloro-3,3,3-trifluoropropene, 1233zd E or Z or combination thereof, alone or in a combination including one or more co-blowing agents such as a hydrofluoroolefin (HFO), a hydrochlorofluoroolefin (HCFO) not including 1233zd, a hydrofluorocarbon (HFC), a hydrofluoroether (HFE), a hydrocarbon, an alcohol, an aldehyde, a ketone, an ether/diether or carbon dioxide.

The preferred hydrofluoroolefin (HFO) typically contains 3, 4, 5, or 6 carbons, and including but not limited to pentafluoropropane, such as 1,2,3,3,3-pentafluoropropene (HFO1225ye), tetrafluoropropene, such as 1,3,3,3-tetrafluoropropene (HFO1234ze, E and Z isomers), 2,3,3,3-tetrafluoropropene (HFO1234yf), 1,2,3,3-tetrafluoropropene (HFO1234ye), trifluoropropene, such as 3,3,3-trifluoropropene (1243zf), all tetrafluorobutenes (HFO1345), all pentafluorobutene isomers (HFO1354), all hexafluorobutene isomers (HFO1336), all heptafluorobutene isomers (HFO1327), all heptafluoropentene isomers (HFO1447), all octafluoropentene isomers (HFO1438), all nonafluoropentene isomers (HFO1429). HCFOs such as, 1-chloro-3,3,3-trifluoropropene (HCFO-1233zd), 2-chloro-3,3,3-trifluoropropene (HCFO-1233xf), HCFO1223, 1,2-dichloro-1,2-difluoroethene (E and Z isomers), 3,3-dichloro-3-fluoropropene, 2-chloro-1,1,1,4,4,4-hexafluorobutene-2 (E and Z isomers), 2-chloro-1,1,1,3,4,4,4-heptafluorobutene-2 (E and Z isomers). Preferred embodiments of the invention include blowing agent compositions of unsaturated halogenated hydroolefins with normal boiling points less than about 60° C.

The preferred blowing agent composition, a hydrofluoroolefin or a hydrochlorofluoroolefin, alone or in a combination, of the present invention exhibits good stability in polyol mixture used in producing polyurethane and polyisocyanurate foams.

Preferred co-blowing agents include, but not limited to: (a) hydrofluorocarbons including but not limited to difluoromethane (HFC32); 1,1,1,2,2-pentafluoroethane (HFC125); 1,1,1-trifluoroethane (HFC143a); 1,1,2,2-tetrafluorothane (HFC134); 1,1,1,2-tetrafluoroethane (HFC134a); 1,1-difluoroethane (HFC152a); 1,1,1,2,3,3,3-heptafluoropropane (HFC227ea); 1,1,1,3,3-pentafluopropane (HFC245fa); 1,1,1,3,3-pentafluobutane (HFC365mfc) and 1,1,1,2,2,3,4,5,5,5-decafluoropentane (HFC4310mee), (b) hydrofluoroolefins including but not limited to tetrafluoropropenes (HFO1234), trifluoropropenes (HFO1243), all tetrafluorobutenes (HFO1345), all pentafluorobutene isomers (HFO1354), all hexafluorobutene isomers (HFO1336), all heptafluorobutene isomers (HFO1327), all heptafluoropentene isomers (HFO1447), all octafluoropentene isomers (HFO1438), all nonafluoropentene isomers (HFO1429), (c) hydrocarbons including but not limited to, pentane isomers, butane isomers, (d) Hydrofluoroether (HFE) such as, $C_4F_9OCH_3$ (HFE-7100), $C_4F_9OC_2H_5$ (HFE-7200), $CF_3CF_2OCH_3$ (HFE-245cb2), $CF_3CH_2CHF_2$ (HFE-245fa), $CF_3CH_2OCF_3$ (HFE-236fa), $C_3F_7OCH_3$ (HFE-7000), 2-trifluoromethyl-3-ethoxydodecofluorohexane (HFE 7500), 1,1,1,2,3-hexafluoro-4-(1,1,2,3,3,3-hexafluoropoxy)-pentane (HFE-7600), 1,1,1,2,2,3,5,5,5-decafluoro-3-methoxy-4-(trifluoromethyl)pentane (HFE-7300), ethyl nonafluoroisobutyl ether/ethyl nonafluorobutyl ether (HFE 8200), $CHF_2OCHF_2$, $CHF_2$—$OCH_2F$, $CH_2F$—$OCH_2F$, $CH_2F$—$O$—$CH_3$, cyclo-$CF_2CH_2CF_2$—$O$, cyclo-$CF_2CF_2CH_2$—$O$, $CHF_2$—$CF_2CHF2$, $CF_3CF_2$—$OCH_2F$, $CHF_2$—$O$—$CHFCF_3$, $CHF_2$—$OCF_2CHF_2$, $CH_2F$—$O$—$CF_2CHF_2$, $CF_3$—$O$—$CF_2CH_3$, $CHF_2CHF$—$O$—$CHF_2$, $CF_3$—$O$—$CHFCH_2F$, $CF_3CHF$—$O$—$CH_2F$, $CF_3$—$O$—$CH_2CHF_2$, $CHF_2$—$O$—$CH_2CF_3$, $CH_2FCF_2$—$O$—$CH_2F$, $CHF2$-$O$—$CF_2CH_3$, $CHF_2CF_2$—$O$—$CH_3$ (HFE254 pc), $CH_2F$—$O$—$CHFCH_2F$, $CHF_2$—$CHF$—$O$—$CH_2F$, $CF_3$—$O$—$CHFCH_3$, $CF_3CHF$—$O$—$CH_3$, $CHF_2$—$O$—$CH_2CHF_2$, $CF_3$—$O$—$CH_2CH_2F$, $CF_3CH_2$—$O$—$CH_2F$, $CF_2HCF_2CF_2$—$O$—$CH_3$, $CF_3CHFCF_2$—$O$—$CH_3$, $CHF_2CF_2CF_2$—$O$—$CH_3$, $CHF_2CF_2CH_2$—$OCHF_2$, $CF_3CF_2CH_2$—$O$—$CH_3$, $CH_2FCF_2$—$O$—$CH_2CH_3$, $(CF_3)_2CF$—$O$—$CH_3$, $(CF_3)_2CH$—$O$—$CHF_2$, $(CF_3)_2CH$—$O$—$CH_3$, and mixture thereof; (e) C1 to C5 alcohols, C1 to C4 aldehydes, C1 to C4 ketones, C1 to C4 ethers and diethers and carbon dioxide, (f) HCFOs such as, 1-chloro-3,3,3-trifluoropropenen (HCFO-1233zd), 2-chloro-3,3,3-trifluoropropene (HCFO-1233xf) and HCFO1223, 1,2-dichloro-1,2-difluoroethene (E and Z isomers), 3,3-dichloro-3-fluoropropene, 2-chloro-1,1,1,4,4,4-hexafluorobutene-2 (E and Z isomers), 2-chloro-1,1,1,3,4,4,4-heptafluorobutene-2 (E and Z isomers).

The present invention thus provides a polyol pre-mix composition which comprises a blowing agent, a polyol, a surfactant, and an encapsulated catalyst composition comprising amine catalysts. In another embodiment, the present invention provides a polyol pre-mix composition which comprises a blowing agent, a polyol, a surfactant, and an encapsulated catalyst composition comprising amine catalysts, wherein the catalyst composition comprises more than one amine catalyst. In another embodiment the present invention provides a stabilized thermosetting foam blend which comprises: (a) a polyisocyanate and, optionally, isocyanate compatible raw materials; and (b) a polyol pre-mix composition. In yet another embodiment, the present invention is a method for stabilizing thermosetting foam blends which comprises combining: (a) a polyisocyanate and, optionally, isocyanate compatible raw materials; and (b) a polyol pre-mix composition. The mixture according to this method produces a stable foamable thermosetting composition which can be used to form polyurethane or polyisocyanurate foams.

The foamable compositions of the present invention generally include one or more components capable of forming foam having a generally cellular structure and a blowing agent, typically in a combination, in accordance with the present invention. In certain embodiments, the one or more components comprise a thermosetting composition capable of forming foam and/or foamable compositions. Examples of thermosetting compositions include polyurethane and polyisocyanurate foam compositions, and also phenolic foam compositions. In such thermosetting foam embodiments, one or more of the present compositions are included as or part of a blowing agent in a foamable composition, or as a part of a two or more part foamable composition, which preferably includes one or more of the components capable of reacting and/or foaming under the proper conditions to form a foam or cellular structure.

The invention also relates to foam, and preferably closed cell foam, prepared from a polymer foam formulation containing a blowing agent comprising the compositions of the present invention. In yet other embodiments, the invention provides foamable compositions comprising thermosetting foams, such as polyurethane and polyisocyanurate foams, preferably low-density foams, flexible or rigid.

It will be appreciated by those skilled in the art that the order and manner in which the blowing agent combination of the present invention is formed and/or added to the foamable composition does not generally affect the operability of the present invention. For example, in the case of polyurethane foams, it is possible that the various components of the blowing agent combination, and even the components of the present composition, not be mixed in advance of introduction to the foaming equipment, or even that the components are not added to the same location in the foaming equipment. Thus, in certain embodiments it may be desired to introduce one or more components of the blowing agent combination in a blender with the expectation that the components will come together in the foaming equipment and/or operate more effectively in this manner. Nevertheless, in certain embodiments, two or more components of the blowing agent combination are combined in advance and introduced together into the foamable composition, either directly or as part of premix that is then further added to other parts of the foamable composition.

In certain embodiments, b-side, polyol premixes include polyols, silicon or non-silicon based surfactants, amine or non-amine based catalysts, flame retardants/suppressors, acid scavengers, radical scavengers, fillers, and other necessary stabilizers/inhibitors. Polyols can include Glycerin based polyether polyols such as Carpol GP-700, GP-725, GP-4000, GP-4520, and etc; Amine based polyether polyols such as Carpol TEAP-265 and EDAP-770, Jeffol AD-310, and etc; Sucrose based polyether polyol, such as Jeffol SD-360, SG-361, and SD-522, Voranol 490, Carpol SPA-357, and etc; Mannich based polyether polyol such as Jeffol R-425× and R-470×, and etc; Sorbitol based polyether polyol such as Jeffol S-490 and etc; Aromatic polyester polyols such as Terate 2541 and 3510, Stepanpol PS-2352, Terol TR-925, and etc.

Catalysts can include N,N-dimethylethanolamine (DMEA), N,N-dimethylcyclohexylamine (DMCHA), Bis (N,N-dimethylaminoethyl)ether (BDMAFE), N,N,N',N',N"- pentamethyldiethylenetriamine (PDMAFE), 1,4-diazadicyclo[2,2,2]octane (DAB CO), 2-(2-dimethylaminoethoxy)-ethanol (DMAFE), 2-((2-dimethylaminoethoxy)-ethyl methyl-amino)ethanol, 1-(bis(3-dimethylamino)-propyl) amino-2-propanol, N,N',N"-tris(3-dimethylamino-propyl) hexahydrotriazine, dimorpholinodiethylether (DMDEE), N,N-dimethylbenzylamine, N,N,N',N",N"'-pentaamethyldipropylenetriamine, N,N'-diethylpiperazine, and etc. In particular, sterically hindered primary, secondary or tertiary amines are useful, for example, dicyclohexylmethylamine, ethyldiisopropylamine, dimethylcyclohexylamine, dimethylisopropylamine, methylisopropylbenzylamine, methylcyclopentylbenzylamine, isopropyl-sec-butyl-trifluoroethylamine, diethyl-α-phenyethyl)amine, tri-n-propylamine, dicyclohexylamine, t-butylisopropylamine, di-t-butylamine, cyclohexyl-t-butylamine, de-sec-butylamine, dicyclopentylamine, di-α-trifluoromethylethyl)amine, di-(α-phenylethyl)amine, triphenylmethylamine, and 1,1,-diethyl-n-propylamine. Other sterically hindered amines are morpholines, imidazoles, ether containing compounds such as dimorpholinodiethylether, N-ethylmorpholine, N-methylmorpholine, bis(dimethylaminoethyl)ether, imidizole, n-methylimidazole or 1-methylimidazole, 1,2-dimethylimidazole, dimorpholinodimethylether, N,N,N'N",N"'-pentamethyldiethylenetriamine, N,N,N'N"',N"'-pentaethyldiethylenetriamine, N,N,N'N",N"'-pentamethyldipropylenetriamine, bis (diethylaminoethyl)ether, bis(dimethylaminopropyl)ether, or combination thereof.

Non-amine catalysts may comprise an organometallic compound containing bismuth, lead, tin, antimony, cadmium, cobalt, iron, thorium, aluminum, mercury, zinc, nickel, cerium, molybdenum, titanium, vanadium, copper, manganese, zirconium, magnesium, calcium, sodium, potassium, lithium, or combination thereof. Examples of an organometallic compound include stannous octoate, dibutyltindilaurate (DGTDL), dibutyltinmercaptide, phenylmercuric propionate, lead octoate, potassium acetate/octoate, magnesium acetate, titanyl oxalate, potassium titanyl oxalate, quaternary ammonium formates, ferric acetylacetonate, and the like and combination thereof.

The use level of catalysts is typically in an amount of from about 0.1 ppm to 6.00 wt % of polyol premix, preferably from about 0.5 ppm to 4 wt %, and more preferably from 1 ppm to 2 wt %.

The surfactants can include polysiloxane polyoxyalkylene block co-polymer such as B8404, B8407, B8409, B8462 and B8465 of Goldschmidt, DC-193, DC-197, DC-5582, and DC-5598 of Air Products, L-5130, L5180, L-5340, L-5440, L-6100, L-6900, L-6980, and L6988 of Momentive. Non-silicone surfactants include salts of sulfonic acid, alkali metal salts of fatty acid, ammonium slats of fatty acid, oleic acid, stearic acid, dodecylbenzenedidulfonic acid, dinaphthylmetanedissulfonic acid, ricinoleic acid, an oxyethylated alkylphenol, an oxyethylated fatty alcohol, a paraffin oil, a caster oil ester, a ricinoleic acid ester, Turkey red oil, groundnut oil, a paraffin fatty alcohol, or combination thereof. The typically surfactant use levels are 0.4 to 6 wt % of polyol premix, preferably 0.8 to 4.5 wt %, and more preferably 1 to 3 wt %.

Flame retardants can include trichloropropyl phosphate (TCPP), triethyl phosphate (TEP), diethyl ethyl phosphate (DEEP), diethyl bis(2-hydroxyethyl) amino methyl phosphonate, brominated anhydride based ester, dibromoneopentyl glycol, brominated polyether polyol, melamine, ammonium polyphosphate, aluminium trihydrate (ATH), tris(1,3-dichloroisopropyl) phosphate, tri)2-chlororthyl) phosphate, tri(2-chloroisopropyl) phosphate, chloroalkyl phosphate/oligomeric phosphonate, oligomeric chloroalkyl phosphate, brominated flame retardant based on pentabromo diphenyl ether, dimethyl methyl phosphonate, diethyl N,N bis(2-hydroxyethyl) amino methyl phosphonate, oligomeric phosphonate, and derivatives of above mentioned.

In certain embodiments, acid scavengers, radical scavengers, and other stabilizers/inhibitors are desired. Stabilizer/inhibitors can include 1,2-epoxy butane, glycidyl methyl ether, cyclic-terpenes such as dl-limonene, 1-limonene, d-limonene, and etc, 1,2-epoxy-2,2-methylpropane, nitromethane, diethylhydroxylamine, alpha methylstyrene, isoprene, p-methoxyphenol, m-methoxyphenol, dl-limonene oxide, hydrazines, 2,6-di-t-butyl phenol, hydroquinone, organic acids such as carboxylic acid, dicarboxylic acid, phosphonic acid, sulfonic acid, sulfamic acid, hydroxamic acid, formic acid, acetic acid, propionic acid, butyric acid, caproic acid, isocaprotic acid, 2-ethylhexanoic acid, caprylic acid, cyanoacetic acid, pyruvic acid, benzoic acid, oxalic acid, malonic acid, succinic acid, adipic acid, azelaic acid, trifluoroacetic acid, methanesulfonic acid, benzenesulfonic acid, and combinations thereof. Other additives can include adhesion promoters, anti-static agents, antioxidants, fillers, hydrolysis agents, lubricants, anti-microbial agents, pigments, viscosity modifiers, and UV resistance agents as desired. Examples of these additives include but are not limited to, sterically hindered phenols, diphenylamines, benzofuranone derivatives, butylated hydroxytoluene (BHT), calcium carbonate, barium sulphate, glass fibers, carbon fibers, micro-spheres, silicas. Melamine, carbon black, form of waxes and soaps, organometallic derivatives of antimony, copper, and arsenic, titanium dioxide, chromium oxide, iron oxide, glycol ethers, dimethyl AGS esters, propylene carbonate, benzophenone and benzotriazole compounds derivatives.

In certain embodiments, an ester is present to provide stability of polyol blends over time, esters can include those with the formula a) R—C(O)—O—R', where R and R' can be $C_aH_{c-b}G_b$, where G is a halogen such as F, Cl, Br, I, a=0 to 15, b=0 to 31, and c=1 to 31, and esters that are product of dicarboxylic acid, phosphinic acid, phosphonic acid, sulfonic acid, sulfamic acid, hydroxamic acid, or combination thereof. The preferred esters are the products of an alcohol such as but not limited to methanol, ethanol, ethylene glycol, diethylene glycol, propanol, isopropanol, butanol, iso-butanol, pentanol, iso-pentanol, and the like and mixtures thereof; an acid such as formic, acetic, propionic, butyric, caproic, isocaprotic, 2-ethylhexanoic, caprylic, cyanoacetic, pyruvic, benzoic, trifluoacetic, oxalic, malonic, succinic, adipic, glutaric, citric, zaelaic, trifluoroacetic, methanesulfonic, benzene sulfonic acid, and the like and mixture thereof. The more preferred esters include but are not limited to methyl formate, ethyl formate, methyl acetate, ethyl acetate, and the like and the mixture thereof.

An ester can be pre-added with the blow agent, or can be added separately from the blowing agent into polyol blends directly by means known to one skilled in the art. A typical amount of an ester is from 0.1 wt % to 10 wt % of polyol blends, the preferred amount of an ester is from 0.2 wt % to 7 wt % of polyol blends, and the more preferred amount of an ester is from 0.3 wt % to 5 wt % of polyol blends.

EXAMPLES

Example 1

Formulations having an Iso Index of 115 were tested which each contained Rubinate M, a polymeric methylene diphenyl diisocyanate (MDI) available from Huntsman; Jeffol R-425-X, a polyol from Huntsman; Voranol 490, a polyol from Dow Chemical; Stephan 2352, a polyol from Stepan; TCPP a flame retardant from Rhodia; B 8465 a surfactant from Evonik Corp; Polycat 8 and 5 (pentamethyldiethylenetriamine, PMDETA) available from Air Products. Total blowing level is 20.0 mls/g. Table 1 summarizes formulations, A and B.

TABLE 1

| | % (Weight) | |
|---|---|---|
| | Formulation A | Formulation B |
| Voranol 490 | 18.10 | 18.02 |
| Jeffol R-425-X | 10.90 | 10.86 |
| Stepan 2352 | 7.20 | 7.15 |
| PMDETA (PC-5) | 0.07 | 0.07 |
| DMCHA (PC-8) | 0.37 | 0.37 |
| Tegostab B 8465 | 0.71 | 0.71 |
| TCPP | 2.36 | 2.36 |
| Water | 0.64 | 0.64 |
| 1233zd | 7.00 | 0 |
| HFC245fa | 0.00 | 7.18 |
| Rubinate M | 52.7 | 52.6 |

The A-side (MDI) and freshly prepared B-side (mixture of the polyol, surfactant, catalysts, blowing agent, and additives) were mixed with a hand mixer and dispensed into a container to form a free rise foam. When making a free rise foam, the dispensed material was allowed to expand in an open container. The reactivities, density, and foam quality is summarized in Table 2.

TABLE 2

| | Formulation A | Formulation B |
|---|---|---|
| Cream time (s) | 12 | 13 |
| Gel time (s) | 50 | 49 |
| Tack free time (s) | 109 | 105 |
| Free rise density (pcf) | 2.09 | 2.09 |
| Foam quality | Good | Good |

As shown in Table 2, the freshly made polyol blends produced foams with similar free rise density and foam quality.

Example 2

The B-side polyol blends of formulations A, and B, were then aged under ambient conditions for 9 months, and foams were made using the same process as the freshly made foam, the results are summarized in Table 3.

TABLE 3

| | Formulation A | Formulation B |
|---|---|---|
| Cream time (s) | 21 | 13 |
| Gel time (s) | 61 | 62 |
| Tack free time (s) | —* | 112 |
| Free rise density (pcf) | —* | 2.22 |
| Foam quality | Poor | Good |

*Can not be measured due to poor foam quality

As shown in Table 3, the aged polyol blends with HFC245fa blowing agent produced foam similar to the freshly made foam while the aged polyol blends with 1233zd blowing agent did not produce an acceptable foam.

Example 3

The encapsulation materials tested were three side chain crystallizable (SCC) polymers: Intelimer® 8600 polymer, Intelimer® 13-1 polymer, and Intelimer® 13-6 polymer, all available from Air Products and Chemicals Inc. The physical properties of the SCC polymers are summarized as in Table 4.

TABLE 4

| | Intelimer ® 8600 | Intelimer ® 13-1 | Intelimer ® 13-6 |
|---|---|---|---|
| Appearance | Milky white liquid | White to light yellow pellets | White to light yellow pellets |
| Total Solids (%) | 45-49 | 100 | 100 |
| Viscosity (cPs) | 40-100 (25° C.) | 650 (93° C.) | 650 (93° C.) |
| Melt Temp ° C. | 42-44 | 48 | 65 |

Intelimer® 13-1 polymer and Intelimer® 13-6 polymer were grounded using dry ice to prevent melting during grinding. After the dry ice evaporated, the fine powders were dried in a desiccator for three days prior to use. A generic spray foam formulation was used having a B-side composition as set out in Table 5.

TABLE 5

| Formulation | % (weight) |
|---|---|
| Jeffol R-470-X | 15.0 |
| Jeffol SG-360 | 15.0 |
| Terate 2031 | 36.0 |
| PMDETA (PC-5) | 0.2 |
| DMCHA (PC-8) | 2.8 |
| Dabco T-120 | 0.2 |
| Tegostab B 8486 | 1.0 |
| Saytex RB-79 | 10.0 |
| TCPP | 6.0 |
| Water | 2.0 |
| Trans-1233zd | 11.8 |
| Total B side | 100.0 |

Jeffol R-470-X and SG-360 are polyols available from Huntsman; Terate 2031 is a polyol available from Invista. Polycat 8 and 5 (pentamethyldiethylenetriamine, PMDETA) and Dabco T-120 are catalysts available from Air Products, Tegostab B 8465 is a surfactant available from Evonik Corp, TCPP is a flame retardant available from Rhodia; Saytex RB-79 is a flame retardant available from Albemarle Corp.

The catalyst combinations, PC5, PC8, and Dabco T-120 and surfactant were pre-blended with each of the three polymers, Intelimer® 8600 polymer, Intelimer® 13-1 polymer, and Intelimer® 13-6 polymer in combinations summarized in Table 6.

TABLE 6

| | Weight (g) | | | |
|---|---|---|---|---|
| | Example 3a1 | Example 3a2 | Example 3a3 | Example 3a4 |
| Intelimer ® 8600 | 0 | 15.7 | 0 | 0 |
| Intelimer ® 13-1 | 0 | 0 | 15.7 | 0 |
| Intelimer ® 13-6 | 0 | 0 | 0 | 15.7 |
| PMDETA (PC-5) | 1.0 | 1.0 | 1.0 | 1.0 |
| DMCHA (PC-8) | 13.7 | 13.7 | 13.7 | 13.7 |

TABLE 6-continued

| | Weight (g) | | | |
|---|---|---|---|---|
| | Example 3a1 | Example 3a2 | Example 3a3 | Example 3a4 |
| Dabco T-120 | 1.0 | 1.0 | 1.0 | 1.0 |
| Tegostab B 8486 | 4.9 | 4.9 | 4.9 | 4.9 |

The polymers and additives were blended at room temperature in shaker overnight. Thereafter, the blends were formulated into B-side blends according to Table 5 using combinations 3a1 to 4. The complete B-side blends were mixed at room temperature in a shaker over night. Each sample was diluted with a solution of deuterated chloroform (CDCl$_3$) solvent. The blends were then analyzed for $^1$H NMR spectra at 25° C. The amine and silicon surfactant were normalized to TCPP and therefore quantified. Table 7 summarizes the results.

TABLE 7

| Relative amount* | Example 3a1 (control) | Example 3a2 | Example 3a3 | Example 3a4 |
|---|---|---|---|---|
| DMCHA (PC-8) (%) | 100.0 | 102.0 | 103.0 | 99.5 |
| Tegostab B 8486 (%) | 100.0 | 102.1 | 102.8 | 99.6 |

*Relative amount quantified using TCPP as the reference using $^1$H NMR.

Table 7 shows that the amount of catalyst and surfactant when mixed with polymers, examples 3a2, 3a3 and 4, did not vary from the control run in Example 3a1. Thus, just mixing the polymer with the catalyst and surfactant blend did not trap or absorbed or adsorbed either the catalyst or the surfactant. If the additives were encapsulated in polymer, the amount of additives would be less than the control.

Example 3b1

The catalyst combination, PC5, PC8, and Dabco T-120 and surfactant were than encapsulated with the polymers as follows:
Intelimer® 13-1 polymer was ground and then melted at 50° C. 3 parts by weight of molten polymer was mixed with 1 part by weight of catalyst and surfactant blend 3a1. The blend was then placed in a shaker in which the temperature was controlled at 55° C. for approximately an hour; the temperature was then rapidly reduced to 10° C. so that the polymer with the catalysts and surfactant solidified. After being ground into a fine powder, a B-side blend was formulated according to Table 5 and place in a shaker at room temperature overnight.

Example 3b2

The catalyst combination, PC5, PC8, and Dabco T-120 and surfactant were encapsulated as described in Example 3b1 with 6 parts of Intelimer® 13-1. The results were summarized as in Table 8.

TABLE 8

| Relative amount* | Example 3a1 (control) | Example 3b1 | Example 3b2 |
|---|---|---|---|
| DMCHA (PC-8) | 100.0 | 55.4 | 33.1 |
| Tegostab B 8486 | 100.0 | 75.0 | 78.8 |

*Relative amount quantified using TCPP as the reference using $^1$H NMR

As in Example 3b1 (3 parts polymer), 55.4% of catalyst remained in polyol, and 44.6% was encapsulated; increasing amount of polymer to 6 parts resulting in 66.9% of catalyst encapsulated; while smaller amounts of surfactant were encapsulated.

Example 4

Example 3b1 was aged for 24 hours to provide Example 4 and analyzed to see if the amine and/or silicone surfactant leaked out of the encapsulation. The results are summarized in Table 9.

TABLE 9

| Relative amount | Example 3b1 | Example 4 |
|---|---|---|
| DMCHA (PC-8) | 55.4 | 54.5 |
| Tegostab B 8486 | 75.0 | 73.1 |

Table 9 shows that the amounts of both the amine and the surfactant remained relatively constant, thus there is no leak of either amine or surfactant out of the polymer.

Example 5

Example 3b1 was melted at 50° C. and cooled down at 10° C. over a period of 30 minutes. The resulting material was analyzed to see if encapsulated amine and surfactant could be released. Table 10 summarizes the results.

TABLE 10

| Relative amount | Example 3b1 | Example 5 |
|---|---|---|
| DMCHA (PC-8) | 55.4 | 75.4 |
| Tegostab B 8486 | 75.0 | 82.7 |

Table 10 shows that heating of the encapsulated amine and surfactant above the boiling point of the encapsulating polymer followed by cooling releases the amine and surfactant out of the polymer.

Although the invention is illustrated and described herein with reference to specific embodiments, it is not intended that the appended claims be limited to the details shown. Rather, it is expected that various modifications may be made in these details by those skilled in the art, which modifications may still be within the spirit and scope of the claimed subject matter and it is intended that these claims be construed accordingly.

The invention claimed is:

1. A foam premix which exhibits prolonged shelf-life/stability comprising a foam forming component selected from polyol, polyisocyante and isocyante; a surfactant encapsulated in an encapsulating agent; a catalyst encapsulated in an encapsulating agent; a halogenated hydroolefin blowing agent; a carbon dioxide generating agent; and optionally an ester.

2. The foam premix of claim 1, wherein said encapsulating agent is a thermoplastic or crystallizable polymer.

3. The foam premix of claim 2, wherein said crystallizable polymer is a side chain crystallizable polmer.

4. The foam premix of claim 3, wherein said side chain crystallizable polmer is selected from the group consisting of alkyl acrylate and alkyl methacrylate having substituted or unsubstituted side chains of from about 6 to 50 carbons.

5. The foam premix of claim 1, wherein said surfactant encapsulated in an encapsulating agent and said acatalyst encapsulated in an encapsulating agent have a particle size of about 2800 microns or less.

6. The foam premix of claim 2, wherein said thermoplastic or crystallizable polymer have a transition point of from about 30° to 250° C.

7. The fbam premix of claim 1, further comprising a co-blowing agent selected from the list consisting of hydrofluorocarbons, hydrofluoroolefins other than said blowing agent, hydrofluororethers, C1 to C5 alcohols, C1 to C4 aldehydes, C1 to C4 ketones, C1 to C4 ethers, diethers, hydrochlorofluoroolefins other than said blowing agent and mixtures thereof.

8. The foam premix of claim 1, further comprising a metallic salt selected from the group consisting of alkali earth carboxylates, alkali carboxylates, and carboxylates and mixtures thereof of metals selected from the group consisting of zinc, cobalt, tin, cerium, lanthanum, aluminum, vanadium, manganese, copper, nickel, iron, titanium, zirconium, chromium, scandium, calcium, magnesium, strontium, and barium and mixtures thereof.

9. The foam premix of clam 1, wherein said catalyst is selected form the group consisting of amine catalysts and metallic compounds.

10. The foam premix of claim 9, wherein said amine catalyst is sleeted from the group consisting of N-(3-dimethylaminopropyl)-N,N-dlisopropanolantine, N,N-bis(3-dimethylaminopropyl)-N-isopropanolamine, 1,3-propanediamine, N'-(3-dimethylamino)propyl-N,N-dimethyl-, triethylenediamine, 1,2-dimethylimidazole, 1,3-propanediamine,N'-(3-(dimethylamino)propyl)-N,N-dimethyl-, N,N, N'N'-tramethylhexanediamine, N,N'',N'''-trimethylaminoethylpiperazine, N,N,N',N'tetramethylethylenediamine, N,N-dimethylcyclohexylamine (DMCHA), Bis(N,N-dimethylaminoethyl)ether (BDMAFE), 1,4-diazadicyclo[2,2,2]octane (DABCO), 2-((2-dimethylaminoethoxy)-ethyl methyl-amino)ethanol, 1-(bis(3-dimethylamino)-propyl) amino-2-propano N,N',N''-tris(3-dimethylamino-propyl) hexahydrotriazine, dimorpholinodiethylether (DMDEE), N,N-dimethylhenzylamine, N,N,N',N'',N'''-pentaamethyldipropylenetriamine, N,N'-diethylpiperazine, dicyclohexylmethylamine, ethyldiisoproylamine, dimethylcyclohexylamine, dimethylisopropylamine, methylisopropylbenzylamine, methyleyclopentylbenzylamine, isopropyl-sec-butyl-trifluoroethylamine, diethyl-(α-phenyethyl)amine, tri-n-propylamine, dicyclohexylamine, t-butylisopropylamine, di-t-butylamine, cyclohexyl-t-hutylamine, de-sec-butylamine, dicyclopentylamine, di-(α-trifluoromethylethyl)amine, di-(α-phenylethyl)amine, triphenyhnethylamine, and 1,1-diethyl-n-propylamine, morpholines, imidazoles, dimorpholinodiethylether, N-ethylmorpholine, N-methyimorpholine, bis(dimethylaminoethyl)ether, imidizole, n-methylimidazole, 1,2-dimethylimidazole, dimorpholinodimethylether, N,N,N',N',N'',N''-pentamethyldipropylenetriamine, dis(diethylaminoethyl)ether, bis(dimethylaminopropyl)ether, bis-(2-dimethylaminoethyl)ether; N,N-dimetnylethariolamine; N-ethylmorpholine; N-methylmorpholine; N,N,N'-trimethyl-N''-hydroxyethyl-bisaminoethylether; N-(3-dimethylaminopropyl)-N,N-diisopropanolamine; N,N-bis(3-dimethylaminopropyl)-N-isopropanolamine; 2-(2-dimethylaminoethoxy)ethanol; N,N,N'-trimethylaminoethyl-ethanolamine; and 2,2'-dimorpholinodiethylether, and mixtures thereof.

11. The foam premix of claim 9, wherein said halogenated hydroolefin blowing agent is selected from the group consiting of hydrofluoroolefins and hydrochlorofluoroolefins.

12. The foam premix of claim 1, further comprising a stabilizer selected from the group consisting of 1,2-epoxy butane, glycidyl methyl ether, cyclic-terpenes such as dl-limonene, 1-limonene, d-limonene, and etc, 1,2-epoxy-2,2-methylpropane, nitromethane, diethylhydroxyl amine, alpha methylstyrene, isoprene, p-methoxyphenol, m-methoxyphenol, dl-limonene oxide, hydrazines, 2,6-di-t-butyl phenol, hydroquinone, organic acids such as carboxylic acid, dicarboxylic acid, phosphonic acid,sulfonic acid, sulfamic acid, hydroxamic acid, formic acid, acetic acid, propionic acid, butyric acid, caproic acid, isocaprotic acid, 2-ethylhexanoic acid, caprylic acid, cyanoacetic acid, pyruvic acid, benzoic acid, oxalic acid, malonic acid, succinic acid, adipic acid, azelaic acid, trifluoroacetic acid, methanesulfonic acid, benzenesulfonic, acid and mixtures thereof.

\* \* \* \* \*